United States Patent
Pottier

(10) Patent No.: US 6,598,378 B1
(45) Date of Patent: Jul. 29, 2003

(54) QUICK RELEASE SYSTEM FOR MOUNTED ROLLERS

(75) Inventor: Benoit Pottier, Vieugy (FR)

(73) Assignee: ITW Mima Systems, SA, Cedex (FR)

( * ) Notice: Subject to any disclaimer, the term of this patent is extended or adjusted under 35 U.S.C. 154(b) by 59 days.

(21) Appl. No.: 09/678,662

(22) Filed: Oct. 4, 2000

(30) Foreign Application Priority Data

Oct. 7, 1999 (EP) .............................................. 99307923

(51) Int. Cl.[7] .......................... B65B 41/10; B65B 41/16
(52) U.S. Cl. ...................... 53/556; 53/389.1; 53/389.4; 492/45
(58) Field of Search ............................... 53/556, 389.2, 53/389.4; 492/45, 47, 16, 17, 19; 226/90, 46; 242/573.4, 577.4, 578, 587, 588.2, 590, 596; 403/4, 46, 83, 84, 92, 93, 102, 109.3, 321, 322.1, 322.2; 83/698.41, 666

(56) References Cited

U.S. PATENT DOCUMENTS

| | | | |
|---|---|---|---|
| 3,894,478 A | * 7/1975 | Miskolczi et al. | 493/354 |
| 4,261,788 A | 4/1981 | McClung | |
| 4,365,535 A | * 12/1982 | Buttner et al. | 84/421 |
| 4,386,839 A | * 6/1983 | Kumagai et al. | 399/116 |
| 4,649,631 A | * 3/1987 | Orth | 29/700 |
| 4,805,432 A | * 2/1989 | Paulhac | 384/454 |
| 4,961,527 A | * 10/1990 | Sakamoto | 226/74 |
| 5,145,453 A | * 9/1992 | Anderson et al. | 452/142 |
| 5,169,450 A | * 12/1992 | Opad et al. | 118/621 |
| 5,170,699 A | * 12/1992 | Senalada | 99/504 |
| 5,272,785 A | * 12/1993 | Stegens | 15/179 |
| 5,322,233 A | * 6/1994 | Hehner et al. | 242/596 |
| 5,364,202 A | * 11/1994 | Ettelbrueck | 101/407.1 |
| 5,371,576 A | 12/1994 | Gonda | |
| 5,547,448 A | * 8/1996 | Robertson | 492/16 |
| 5,576,803 A | * 11/1996 | Williams et al. | 399/116 |
| 5,582,099 A | * 12/1996 | Rosser | 100/155 R |
| 5,628,612 A | * 5/1997 | Bates et al. | 414/802 |
| 5,660,484 A | * 8/1997 | Peel | 384/517 |
| 5,738,578 A | * 4/1998 | Marchese | 452/142 |
| 5,758,684 A | * 6/1998 | Hudson et al. | 137/269 |
| 5,893,210 A | * 4/1999 | Takei et al. | 264/274 |
| 6,097,909 A | * 8/2000 | Watanabe et al. | 399/111 |
| 6,139,478 A | * 10/2000 | Viaud et al. | 492/16 |
| 6,178,725 B1 | * 1/2001 | Sperry et al. | 53/451 |
| 6,267,249 B1 | * 7/2001 | Carpenter et al. | 198/370.02 |
| 6,267,373 B1 | * 7/2001 | Takata | 193/37 |
| 6,422,985 B1 | * 7/2002 | Heitmann | 492/16 |
| 6,439,797 B1 | * 8/2002 | Campbell | 403/321 |

FOREIGN PATENT DOCUMENTS

| | | | |
|---|---|---|---|
| DE | 297 12 743 | 9/1997 | |
| EP | 0 803 437 | 10/1997 | |
| EP | 0 747 287 | 10/1998 | |
| EP | 0 919 467 A2 | * 2/1999 | ........... B65B/11/02 |
| EP | 0 919 467 | 6/1999 | |
| EP | 919 467 | 6/1999 | |

* cited by examiner

*Primary Examiner*—Rinaldi I. Rada
*Assistant Examiner*—Gloria Weeks
(74) *Attorney, Agent, or Firm*—Lowe Hauptman Gilman & Berner, LLP

(57) ABSTRACT

A quick release mechanism for a roller (6, 7) wherein the roller (6, 7) is mounted in a frame and rotationally driven (for example, a roller (6, 7) carrying a roll of stretch wrapping film (4) in a stretch wrapping head (1)). The quick release mechanism includes a pair of stub axles (22, 43) which support either end of the roller (6, 7) in the frame. One of the stub axles (22) are fixed within the frame and driven by a motor (8). The connection between this driven stub axle (22) and the roller (6, 7) ensures that no relative rotational movement occurs. The other stub axle (43) is "lockable" in a hole in the frame but is removable therefrom. The connection between the removable stub axle (43) and the roller (6, 7) allows free relative rotational movement. Withdrawal of the removable stub axle (43) from the frame allows the roller (6, 7) to be disconnected from its connection with the driven stub axle (22) and removed from the frame. Refitting of the roller (6, 7) is simply a reversal of this process.

23 Claims, 5 Drawing Sheets

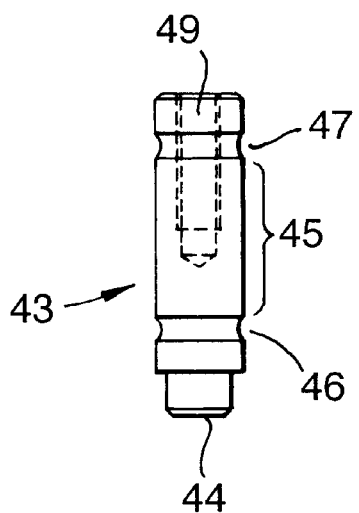
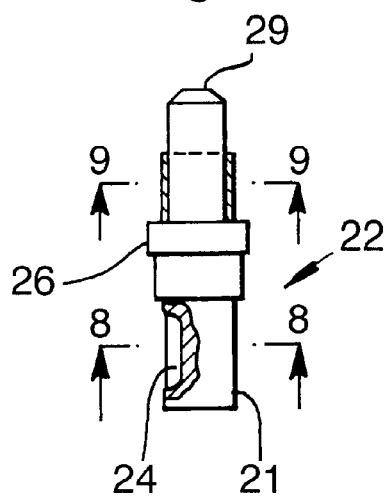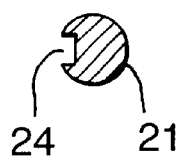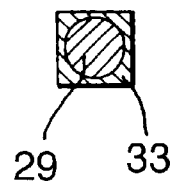

QUICK RELEASE SYSTEM FOR MOUNTED ROLLERS

BACKGROUND OF THE INVENTION

1. Field of the Invention

This invention relates to a system for fitting mounted rollers which allows for quick release/re-fitting of the rollers and more particularly though not solely to a quick release roller mechanism for use in a stretch head of a stretch film wrapping machine incorporating driven rollers.

2. Brief Description of the Prior Art

Apparatus which include rollers having an axis of rotation wherein the roller is supported at either end often require the roller to be removed for re-fitting or servicing and/or subsequent replacement. Some apparatus including rollers as described above include driving means for rotating the roller, complicating the removal and re-fitting process significantly.

An example of apparatus having driven rollers which are often required to be removed and re-fitted is a stretch wrapping head for a stretch wrapping film used in the packaging of products, often on pallets, wherein the stretch wrapping head is rotated about the goods on the pallet and moved in a vertical direction so that the goods on the pallet are held in position and protected from the environment by the stretched wrap. An example of such a stretch wrap head is disclosed in EP-B-747287 and an alternative apparatus which includes a similar type of stretch head is disclosed in EP-A-803437 in which the stretch wrap head is suspended from a rotating arm which rotates above the object to be wrapped.

The stretch heads disclosed in the above mentioned patent specifications both include two driven rollers, the surface speeds of which are not the same and through which a continuous length of plastics film is passed and stretched by the difference in speed between the surface of the rollers. EP-A-919467 discloses an improved stretch wrapping head which includes two parallel driven rollers but which also includes at one end of the rollers an opening to allow easier access to wind the film on the rollers prior to commencing operation.

In each of the above mentioned stretch wrap heads, replacement or removal of the rollers is time consuming and requires the use of tools. It would be an advantage if the rollers could be quickly and simply removed to allow for maintenance and or re-fitting.

Accordingly, it is an object of this invention to provide a quick release mechanism for a roller which at least goes some way towards overcoming the above disadvantages.

SUMMARY OF THE INVENTION

According to this invention, a quick release mechanism for a roller comprising:

frame means in which the roller is adapted to be mounted in use;

apertures in either end of the roller, the apertures aligned with the axis of rotation of the roller; and stub axle means which connect either end of the roller to the frame means by passing through respective holes aligned in the frame means and into the respective roller apertures, the connection between the roller and each stub axle means allowing substantially free angular rotation of the roller relative to the frame means;

wherein one of the stub axle means is axially fixed in the frame means and driven rotationally and provided at or near its end with a non-circular cross-section, the cross-section of the roller aperture into which the driven stub axle means fits having a corresponding shape to allow the roller to be rotated by the driven stub axle means; and wherein the other stub axle means is releasable from its connection with the roller aperture and its connection with the frame means solely by movement along the axis of rotation of the roller, away from the roller, the removable stub axle means having a cylindrical shaft which is adapted at one end to pass through the hole in the frame means and to fit within the aperture in the roller and provided at its opposite end with a knob to facilitate removal of the removable stub axle means from the roller aperture and frame means, the cylindrical shaft including at least two axially separated detents to allow the removable stub axle to be selectively positioned either engaged with the roller and frame means or disengaged from the roller but still engaged with the frame means to facilitate removal of the roller from the frame means.

According to a second aspect of the present invention, a stretch wrapping head for a stretch wrapping machine is adapted to pre-stretch a plastics film through stretch rollers supported in a frame, the rollers held in the frame by a quick release mechanism according to the above paragraph.

BRIEF DESCRIPTION OF THE DRAWINGS

A particular embodiment of the present invention will now be described with reference to the accompanying drawings in which;

FIG. 6 is a front elevation of the shaft of the stub axle as shown in FIGS. 5A and 5B;

FIG. 7 is a front elevation of the driven stub axle shown in FIG. 4;

FIG. 8 is a cross-sectional view of the driven stub axle of FIG. 7 through the line 8—8; and FIG. 9 is a cross-sectional view of the driven stub axle of FIG. 7 through the line 9—9.

DESCRIPTION OF THE PREFERRED EMBODIMENT

Figure 1:
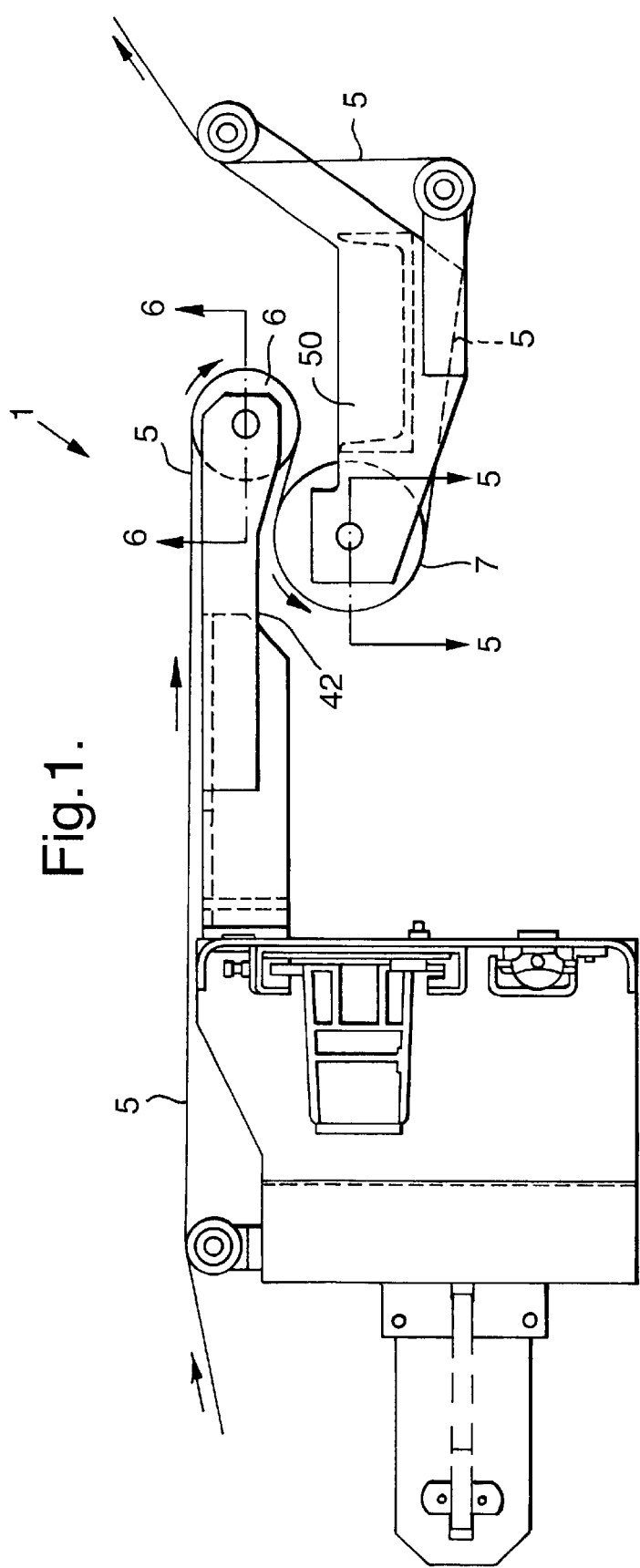
FIG. 1 is a plan elevation of a stretch wrapping head according to a particular embodiment of the present invention.
Figure 2:
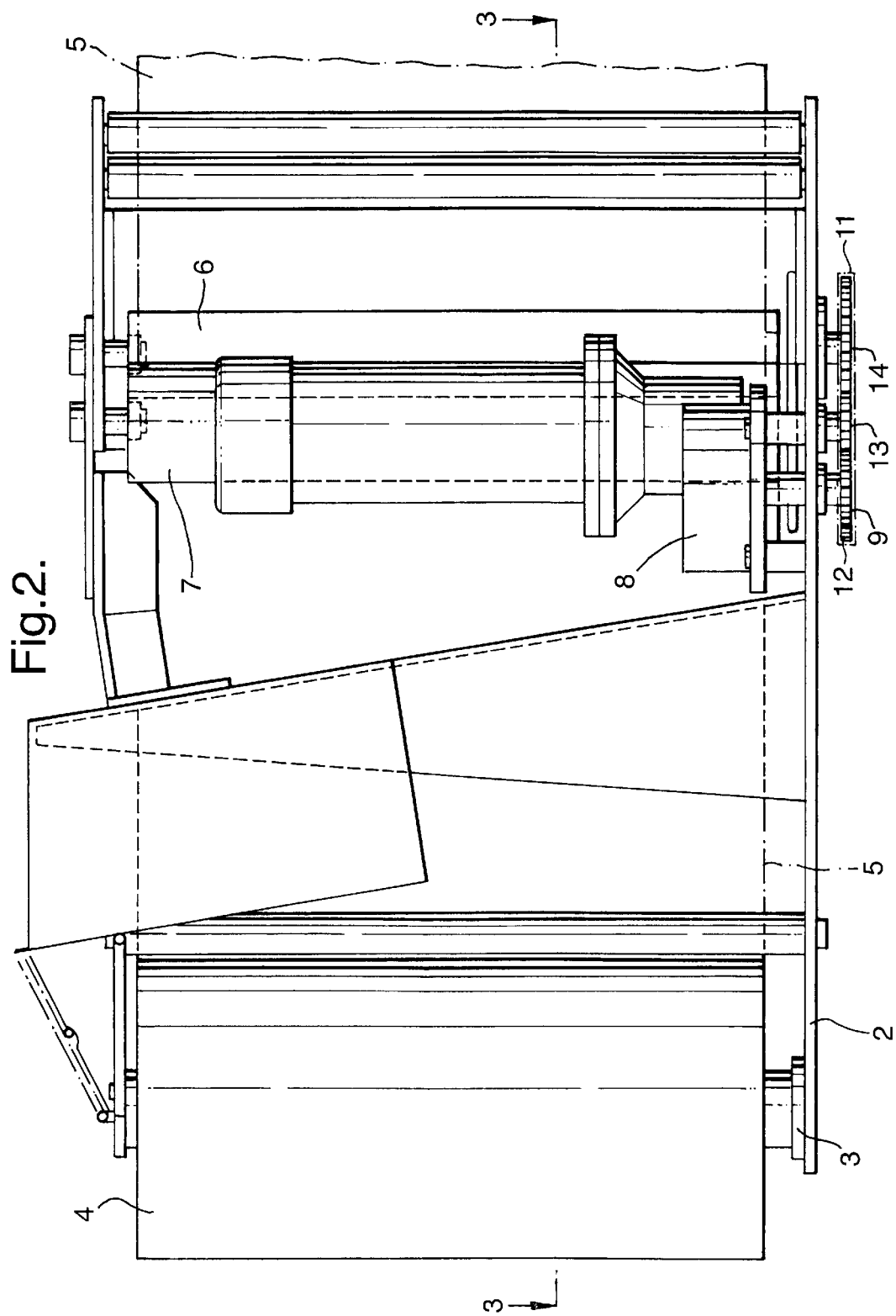
FIG. 2 is a front elevation of the stretch wrapping head of FIG. 1.
Figure 3:
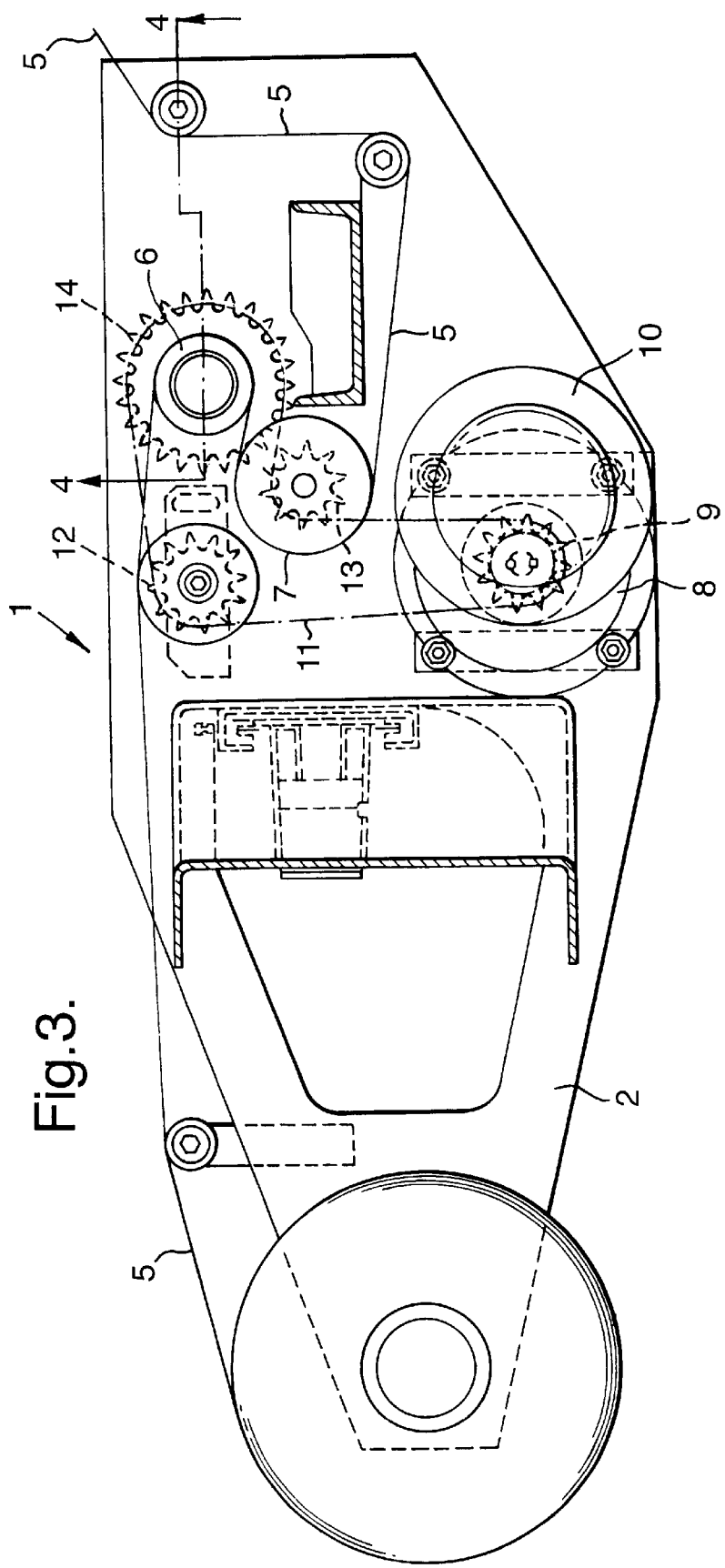
FIG. 3 is a cross-sectional plan elevation through the stretch wrap head of FIGS. 1 and 2 along the line 3—3 of FIG. 2.

Referring to the drawings and in particular FIGS. 1 to 3, a stretch wrapping head 1 is adapted for use in a stretch wrapping machine such as that disclosed in European patent number EP-B-747287 and comprises a base plate 2 (see FIG. 2) upon one end of which a lower bearing member 3 is mounted so as to rotatably support a substantially upstanding or vertically oriented wrapping film supply roll 4 from which a fresh supply of wrapping film 5 is able to be withdrawn in connection with the operation of a package, article, or pallet wrapping operation. The wrapping film 5 may comprise suitable plastics wrapping film which may be "pre-stretched" and which will subsequently "shrink back" towards its unstretched condition after it has been applied to a package, article or pallet.

The basic operation of stretch head 1 is substantially as described in the co-pending European patent application published as EP-A-919467, a summary of which follows.

The wrapping film 5 is fitted around first 6 and a second 7 tension rollers in a substantially reverse "S" shaped path and moves in the direction indicated by the arrows in FIG. 1. A motor 8 rotates a sprocket wheel 9 through a suitable gear box 10. An endless sprocket chain 11 connects the gear box sprocket 9 around a series of other sprockets including a sprocket 14 which is connected by means which will be explained further below to the first tension roller 6 and a sprocket 13 which is connected (also by means which will be explained further below) to second tension roller 7. The position of a further sprocket wheel 12 is adjustable in order to adjust the tension in the endless sprocket chain 11.

It can be seen in FIG. 1 that the diameter of tension roller 6 is less than the diameter of tension roller 7. Accordingly, if both the tension rollers 6 and 7 were rotated at the same speed, the tangential velocity of the film 5 at the surface of roller 6 would be lower than the tangential velocity of the film at the surface of roller 7 and therefore the film would be stretched between rollers 6 and 7 as it is passed through the stretch head. As the rotational speed of the rollers 6 and 7 is also dependent on the diameter of the sprocket wheels 13 and 14, the difference in surface speed of the rollers (and hence the amount of stretch put into the film) is dependent on the roller and sprocket diameters.

It can also be seen in FIG. 1 that although one end of both of the tension rollers 6 and 7 are connected to the same planar part of the structure or frame of the stretch wrap head (that is, base plate 2) the opposite ends of the rollers (the ends shown in FIG. 1) are not directly connected together (one end of roller 6 is mounted in a plate 42 and one end of roller 7 is mounted in a separate plate 50) and therefore a space exists through which the film 5 may be fed in order to facilitate winding the film 5 through the stretch wrap head prior to continuous operation.

Figure 4:
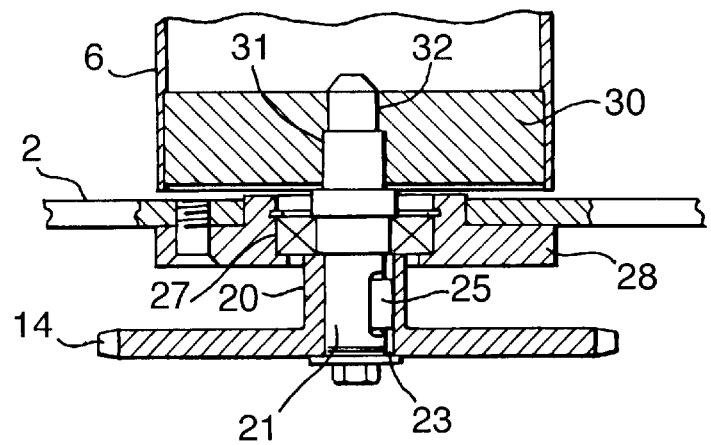
FIG. 4 is a cross-sectional elevation along the line 4—4 of FIG. 3.

With reference now to FIGS. 4 and 7 to 9, the connection between the base plate 2 and the driven end of rollers 6 and 7 will now be described with reference to the roller 6 (the driven connection with roller 7 is preferably identical to the connection with roller 6 and will not therefore be described in detail). In FIG. 4 it can be seen that the driven sprocket 14 (which is preferably provided in various alternative diameters, each having a different number of teeth thereby allowing an operator of the stretch wrap apparatus to vary the speed of the rollers by simply replacing gear wheel 14 while maintaining the speed of drive motor 8 constant) has a central hub 20 within which is housed the cylindrical end portion 21 of a driven fixed stub axle 22 (see FIG. 7). The hub 20 is keyed, having an axially extending slot 23 provided therealong. The cylindrical end portion 21 of fixed stub axle 22 is provided with a complementary slot 24 (seen in cross-section in FIG. 8) which in use is aligned with the slot 23 in the hub of gear wheel 14, a fixing means 25 (such as a steel rod or ball bearing) being positioned within both of the slots to prevent relative rotational movement between the gear wheel and the fixed stub axle 22.

The central part of the fixed stub axle 22 includes a collar 26 which is mounted in a rolling bearing 27 which is itself fixed within a mounting plate 28 which is fixedly attached about an orifice in base plate 2 so that the end 29 of the fixed stub axle protrudes through the base plate 2.

Roller 6 (which preferably is a rubberized roller having a thin layer of rubberized material around its outer surface to enable the plastics film to be gripped) is preferably a hollow metal cylinder having disc inserts fitted within either end, the disc inserts provided with apertures for mounting the rollers within the frame of the stretch wrap head. The disc insert 30 provided at the driven end of the roller 6 is provided with an aperture having first a square shape cross-section 31 and then a circular shaped cross-section 32 further into the roller. The end 29 of the fixed stub axle 22 has a circular cross-section which fits within aperture 32 of the end disc 30, while a section 33 of the ends 29 of the fixed stub axle 22 has a square cross-section which fits within the square aperture 31 of the end disc 30 to ensure that there is no relative rotational movement between the fixed stub axle 22 and the roller 6. It should be noted that the cross-section of section 33 could be any other appropriate non-circular shape.

From the above description it can be seen that rotation of gear wheel 14 will cause roller 6 to rotate at a speed set by the motor and the diameter of sprocket 14.

Figure 5A:
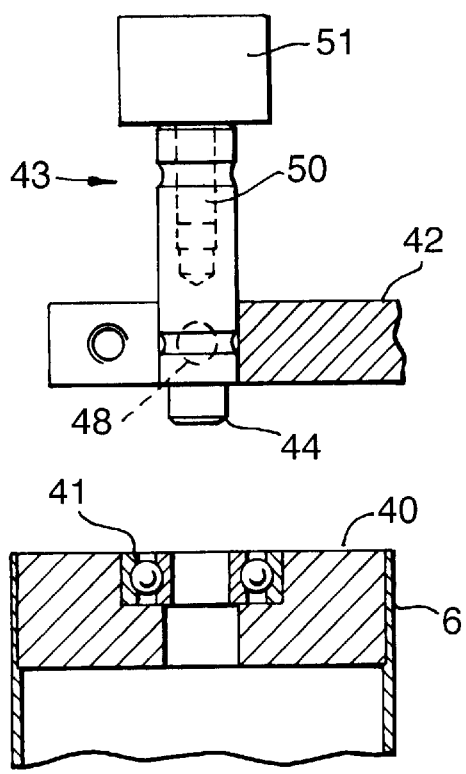
FIGS. 5A and 5B are cross-sectional end elevations through one of the rollers of the stretch wrapping head of FIG. 1 through the line 5—5 of FIG. 1 showing insertion and/or removal of the stub axle of the roller.
Figure 5B:
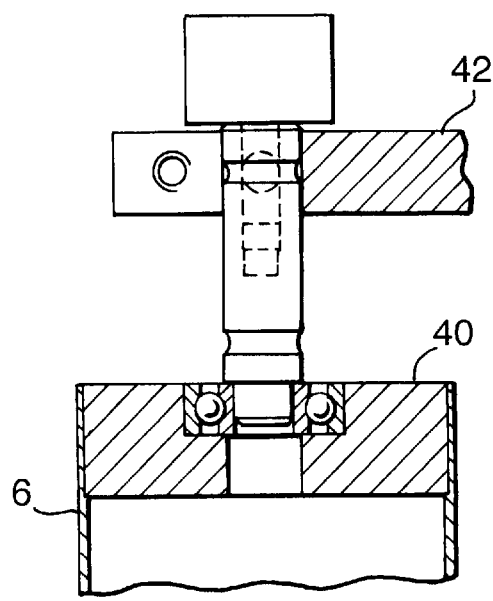

The non-driven end of roller 6 (and also roller 7 which preferably has an identical connection mechanism although it should be noted that only one of rollers 6 or 7 could be fitted with the quick release mechanism herein described) is connected in the frame of the stretch wrap head as shown in FIGS. 5A, 5B and 6. The end of roller 6 is provided with a further disc insert 40 which is provided with a central aperture having mounted therein rolling bearing 41. The part 42 of the frame adjacent the end of roller 6 is provided with a hole through which a removable stub axle 43 passes, the end 44 of the removable stub axle 43 being rounded in cross-section and being a good slide fit within the rolling bearing 41 to allow relative rotational movement between the roller 6 and removable stub axle 43. The removable stub axle 43, as seen in FIG. 6 comprises a cylindrical body portion 45 between narrowed neck sections 46 and 47.

In order to prevent the removable stub axle 43 from moving axially once installed in the stretch wrap head, means are provided within the part 42 of the stretch wrap head frame to lock the removable stub axle in position. For example, a captive ball bearing 48 may be provided in the wall of the hole through which the removable stub axle must pass. The captive ball bearing may be biased (by a spring for example) towards a position protruding into the path of the removable stub axle while being capable of movement out of the stub axle's path. The two neck portions 46 and 47 of the shaft of the removable stub axle 43 form two "detents" into which the ball bearing 48 will protrude, holding the removable stub axle in position until a predetermined axial force is applied to the removable stub axle to force the ball bearing out of the neck portion 46 or 47 against the biasing spring force. The neck portion 46 is useful for holding the stub axle in position within the frame of the stretch wrapping machine (but out of its operatively engaged position) while allowing removal of the roller 6 and the neck portion 47 in use accommodates the ball bearing 48 while the roller is installed and operational.

It can be seen in FIGS. 5A and 5B, that the removable stub axle 43 includes an axial bore or shaft 49 within which is fixed rod 50 protruding from a knob or handle 51. The rod 50 is secured within the axial bore 49 and to the knob or handle 51, the knob 51 being of a convenient size for an operator to grip so that the removable stub axle 43 may be withdrawn or inserted into the frame of the stretch 20 wrapping machine and connected to or disconnected from the rolling bearing 41 in the roller 6 as desired.

In use, in order to remove a roller from the stretch wrapping head it is simply a matter of removing the removable stub axle 43 in a direction along the axis of rotation of the roller away from the roller (in order to remove the roller) or along the axis of rotation towards the roller (to install the roller). In the case of roller removal, once the removable stub axle 43 has been removed from the rolling bearing 41 and positioned as shown in FIG. 5A, it is simply a matter of lifting the other end of roller 6 off the fixed stub axle in order to remove the roller. Replacement or re-fitting of the roller is simply a matter of connecting the driven end of the roller to the fixed stub axle (ensuring that the section 31 of the end 29 of the stub axle is properly engaged with the correspondingly shaped aperture in the end disc 30) and then pushing the moveable stub axle further towards the roller so that the end 44 of the removable stub axle is engaged within the rolling bearing 41.

Accordingly, at least in the preferred form of the present invention a simple, convenient and effective manual system for allowing removal and re-fitting of rollers, and in particular driven rollers, is provided which does away with the need for an operator to use hand or motorised tools and therefore allows much faster and easier removal or replacement of a roller.

What is claimed is:

1. A quick release mechanism for a roller comprising:
   frame means in which the roller is adapted to be mounted in use;
   apertures in either end of the roller, the apertures aligned with the axis of rotation of the roller; and
   stub axle means which connect either end of the roller to the frame means by passing through respective holes aligned in the frame means and into the respective roller apertures, the connection between the roller and each stub axle means allowing substantially free angular rotation of the roller relative to the frame means;
   wherein one of the stub axle means is axially fixed in the frame means and driven rotationally and provided at or near its end with a non-circular cross-section, the cross-section of the roller aperture into which the driven stub axle means fits having a corresponding shape to allow the roller to be rotated by the driven stub axle means; and
   wherein the other stub axle means is releasable from its connection with the roller aperture and its connection with the frame means solely by movement along the axis of rotation of the roller, away from the roller, the removable stub axle means having a cylindrical shaft which is adapted at one end to pass through the hole in the frame means and to fit within the aperture in the roller and provided at its opposite end with a knob to facilitate removal of the removable stub axle means from the roller aperture and frame means, the cylindrical shaft including at least two axially separated detents to allow the removable stub axle to be selectively positioned either engaged with the roller and frame means or disengaged from the roller but still engaged with the frame means to facilitate removal of the roller from the frame means.

2. A quick release mechanism for a roller as claimed in claim 1, wherein the driven stub axle means is provided with a square cross-section at or near its end which fits within a corresponding square cross-sectional aperture in a disc insert forming the end face of the roller.

3. A quick release mechanism for a roller as claimed in claim 1, wherein the end of the removable stub axle means fits within a rolling bearing provided in a disc insert forming the end face of the corresponding end of the roller.

4. A quick release mechanism for a roller as claimed in claim 1, wherein the cylindrical shaft has an axial bore and the knob includes a protruding rod adapted to be received in the bore.

5. A quick release system for mounted rollers, comprising:
   a roller having axially opposite driven and non-driven ends each having an aperture formed therein;
   a frame in which the roller is adapted to be mounted in use;
   driven and non-driven stub axles connecting the driven and non-driven ends of the roller, respectively, to the frame by passing through holes aligned in the frame and into the respective apertures; and
   a locking mechanism provided between the non-driven stub axle and the respective hole of the frame for releasably locking the non-driven stub axle at first and second locking positions while allowing axially slidable movement of the non-driven stub axle therebetween;
   wherein
   the driven stub axle is captively retained in the aperture at the driven end in a manner that prevents relative rotational movement between the driven stub axle and the roller;
   when the non-driven stub axle is locked at the first locking position, the non-driven stub axle is rotatably retained in the aperture at the non-driven end in a manner that allows relative rotational movement between the non-driven stub axle and the roller; and
   when the non-driven stub axle is locked at the second locking position, the non-driven stub axle is completely removed from the aperture of the non-driven end, thereby facilitating quick removal or replacement of the roller.

6. The system of claim 5, wherein the locking mechanism comprises:
   first and second axially spaced indentations formed on a circumferential surface of the non-driven stub axle; and
   a locking element formed in the respective hole of the frame and resiliently biased inwards and towards the non-driven stub axle, engagements of the locking element with the first and second indentations defining the first and second locking position, respectively.

7. The system of claim 6, wherein the first and second indentations are formed in a middle portion and adjacent to distal and proximal end portions, respectively, of the non-driven stub axle, the proximal end portion of the non-driven stub axle having a rounded cross section adapted to be slidably fit within the aperture at the non-driven end of the roller.

8. The system of claim 7, wherein the aperture at the non-driven end of the roller is equipped with a rolling bearing adapted to slidably retain the rounded proximal end of the non-driven stub axle.

9. The system of claim 7, further comprising a knob formed at the distal end of the non-driven stub axle to facilitate removal of the non-driven stub axle from the aperture at the non-driven end of the roller.

10. The system of claim 5, wherein the driven stub axle has a proximal end portion, a distal end portion and a middle portion therebetween, the system further comprising a gear for transmitting driving forces to drive the roller via the driven stub axle, the gear is mounted on the distal end portion of the driven stub axle in a manner that prevents relative rotational movement between the driven stub axle and the gear.

11. The system of claim 10, wherein the gear comprises a central hub in which the distal end portion of the driven stub axle is received, the hub having an axially extending slot and the distal end portion of the driven stub axle having a corresponding axially extending slot, said slots together defining a key path, said system further comprising a key received in the key path to prevent relative rotational movement between the driven stub axle and the gear.

12. The system of claim 11, wherein the key is one of a steel rod and a ball bearing.

13. The system of claim 11, further comprising a mounting plate and a rolling bearing disposed between the middle portion of the driven stub axle and the respective hole of the frame, the driven stub axle being rotatably supported by the frame, the mounting plate and the rolling bearing.

14. The system of claim 13, wherein the proximal end portion of the driven stub axle has a non-circular cross section conforming in size and shape to the aperture at the driven end of the roller.

15. The system of claim 5, wherein the roller comprises a hollow cylinder fitted with disc inserts at the ends thereof, the apertures are formed in the disc inserts.

16. A stretch wrapping machine, comprising:

a frame;

a supply roll of a wrapping film supported by the frame;

a roller assembly for pre-stretching the wrapping film before feeding, said roller assembly comprising:

at least one roller having axially opposite driven and non-driven ends each having an aperture formed therein;

driven and non-driven stub axles connecting the driven and non-driven ends of the roller, respectively, to the frame by passing through holes aligned in the frame and into the respective apertures; and a locking mechanism provided between the non-driven stub axle and the respective hole of the frame for releasably locking the non-driven stub axle at first and second locking positions while allowing axially slidable movement of the non-driven stub axle therebetween;

wherein the driven stub axle is captively retained in the aperture at the driven end in a manner that prevents relative rotational movement between the driven stub axle and the roller;

when the non-driven stub axle is locked at the first locking position, the non-driven stub axle is rotatably retained in the aperture at the non-driven end in a manner that allows relative rotational movement between the non-driven stub axle and the roller; and when the non-driven stub axle is locked at the second locking position, the non-driven stub axle is completely removed from the aperture of the non-driven end, thereby facilitating quick removal or replacement of the roller;

a driving mechanism for driving the roller assembly to stretch the wrapping film; and a transmission mechanism engaged with the driving mechanism and the driven stub axle of the roller assembly for transmitting driving forces from the driving mechanism to the roller assembly.

17. The machine of claim 16, wherein the locking mechanism comprises:

first and second axially spaced indentations formed on a circumferential surface of the non-driven stub axle; and a captive ball bearing formed in the respective hole of the frame and resiliently biased inwards and towards the non-driven stub axle, engagements of the locking element with the first and second indentations defining the first and second locking position, respectively.

18. The machine of claim 17, wherein the first and second indentations are formed in a middle portion and adjacent to distal and proximal end portions, respectively, of the non-driven stub axle, the proximal end portion of the non-driven stub axle having a rounded cross section adapted to be slidably fit within a rolling bearing provided in the aperture of the non-driven end and adapted to slidably retain the rounded proximal end of the non-driven stub axle.

19. The machine of claim 16, wherein the driven stub axle has a proximal end portion, a distal end portion and a middle portion therebetween, the driving mechanism comprising a gear having a central hub in which the distal end portion of the driven stub axle is received, the hub having an axially extending slot and the distal end portion of the driven stub axle having a corresponding axially extending slot, said slots together defining a key path, said machine further comprising a key received in the key path to prevent relative rotational movement between the driven stub axle and the gear.

20. The machine of claim 19, further comprising a mounting plate and a rolling bearing disposed between the middle portion of the driven stub axle and the respective hole of the frame, the driven stub axle being rotatably supported by the frame, the mounting plate and the rolling bearing.

21. The machine of claim 16, wherein the roller assembly comprises two said rollers, the driven ends of the rollers are supported by a common base plate of the frame, the non-driven ends of the rollers are supported by two separate plates of the frame.

22. The machine of claim 21, wherein each of the rollers has a smooth rubberized circumferential surface.

23. The machine of claim 21, wherein one of the rollers has a diameter smaller than the other.

* * * * *